Aug. 6, 1946.  R. BLACK, JR., ET AL  2,405,179
ELECTROMECHANICAL DEVICE
Filed Sept. 4, 1941  2 Sheets-Sheet 1
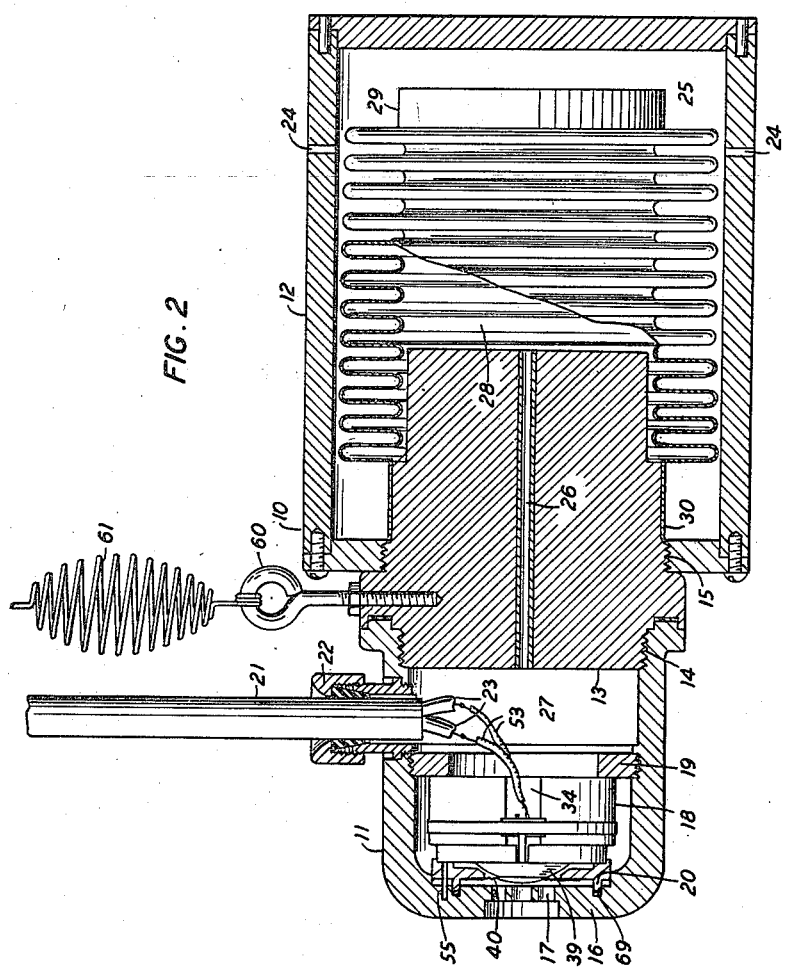
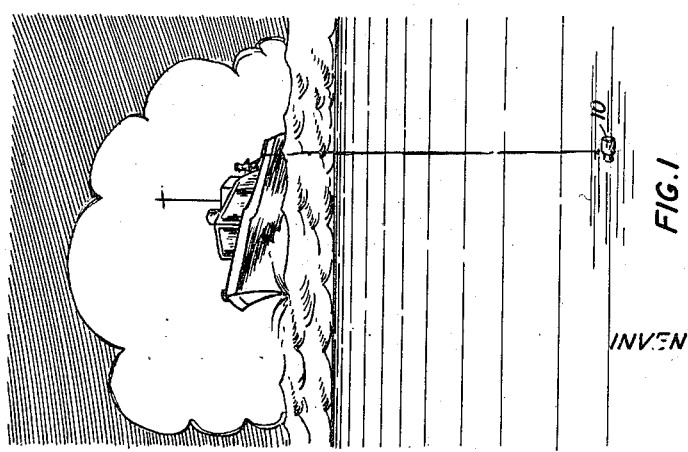
INVENTORS: R. BLACK, JR.
F. F. ROMANOW
BY
Robert J. Pluskey
ATTORNEY Aug. 6, 1946.     R. BLACK, JR., ET AL     2,405,179
ELECTROMECHANICAL DEVICE
Filed Sept. 4, 1941       2 Sheets-Sheet 2
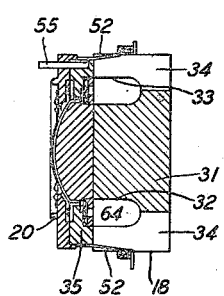
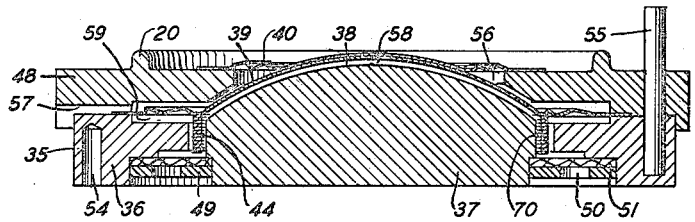
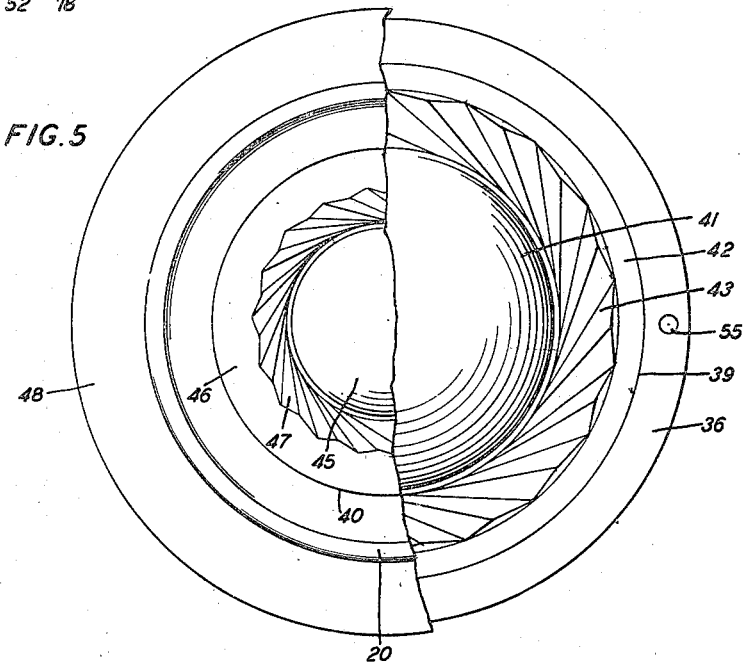
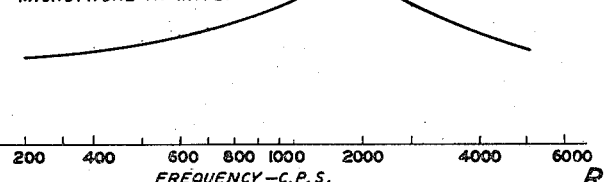
INVENTORS: R. BLACK, JR.
F. F. ROMANOW
BY Robert J. Bluskey
ATTORNEY Patented Aug. 6, 1946

2,405,179

UNITED STATES PATENT OFFICE 2,405,179

ELECTROMECHANICAL DEVICE

Robert Black, Jr., South Orange, and Frank F. Romanow, Berkeley Heights, N. J., assignors to Bell Telephone Laboratories, Incorporated, New York, N. Y., a corporation of New York Application September 4, 1941, Serial No. 409,444

6 Claims. (Cl. 177—386)

This invention relates to electromechanical devices, and, more particularly, to a pressure variation detector or microphone for use in a liquid medium such as water.

An object of the invention is to improve the structure and increase the sensitivity of submarine signal detectors.

A more specific object of the invention is to enable the use of a small moving coil type microphone for submarine signal detection.

An acoustic wave detector or microphone of the type embodying a small light-weight, high strength diaphragm having a moving coil attached to it and arranged in a magnetic air-gap with which air damping means is associated, has been found to be a highly efficient and sensitive device for use in a medium such as air. If such a device is used in a liquid medium such as water, it is found that its characteristics are adversely affected because of the radiation mass of the water, the radiation mass of air being negligible in comparison. In accordance with one feature of this invention, this difficulty is obviated or substantially eliminated by the provision in the microphone of a second and smaller diaphragm that is directly exposed to the water and coupled to the inner and larger diaphragm by a very shallow air chamber or space.

If the microphone is located at any appreciable depth in the water, the hydrostatic pressure on the moving parts thereof becomes considerable and may be sufficiently great to deform or permanently damage the diaphragm structure. In accordance with another feature of the invention, the microphone is enclosed in a rigid structure, non-resonant in the band of frequencies to which the microphone is intended to be responsive, the rigid structure enclosing hydrostatic pressure equalizing means coupled to the rear or non-exposed areas of the diaphragm structure. The pressure equalization arrangement may include a bellows member whose volume varies with the hydrostatic pressure, the water having access both to the diaphragm structure and the bellows through the rigid structure. The water passages to the bellows are of very high impedance to signal pressure variations in the water.

A more complete understanding of the invention will be derived from the detailed description that follows, taken in conjunction with the appended drawings wherein:

Fig. 1 illustrates how the signal detector or microphone of this invention may be supported under water;

Fig. 2 is a partial cross-sectional view of a microphone in accordance with the invention;

Fig. 3 is a cross-sectional view of the microphone unit embodied in the device of Fig. 2;

Fig. 4 is an enlarged cross-sectional view of the pole-piece and diaphragm assembly of the microphone unit of the device of Fig. 2;

Fig. 5 is an enlarged top plan view of the assembly of Fig. 4, partly broken away to show details of diaphragm structure; and Fig. 6 shows a typical response-frequency characteristic for a device actually constructed in accordance with the invention.

The pressure variations detector device or microphone constituting an embodiment of this invention is shown in Fig. 2, partly in cross section and partly broken away. It comprises an enclosure, housing or container 10 consisting of a front, substantially cup-shaped rigid portion 11 and a rear, substantially cylindrical rigid portion 12, joined together at the threaded junctions 14, 15 by a round, shouldered connector block or member 13. The front wall 16 of the portion 11 is provided with a plurality of apertures 17 whereby pressure variations in the medium, namely, water, in which the microphone is located have access to the diaphragm structure of the detector or microphone unit 18. The latter is supported rigidly within the portion 11 and against the inner surface of the wall 16 by the threaded clamping ring 19. The unit 18 will be described hereinafter in greater detail with reference to Figs. 3, 4 and 5. A water-tight seal between the portion 11 and unit 18 is provided by the annulus of rubber 69 in a similarly shaped recess in the wall 16, into which the annular ridge 20 on the outer plate (shown in section in Fig. 2) is adapted to be forced. Electrical connection between the microphone unit and other electrical equipment or devices to be actuated by the electrical currents generated by the microphone unit, is made through the cord or cable 21 entering the portion 11 through a suitable water-tight gland or stuffing box 22, and containing a pair of conductors or wires 23.

The housing portion 12 is provided with one or more apertures or passages 24 that permit entrance of the liquid medium into the space or chamber 25. These apertures, however, are of such cross section and length as to present a very high impedance to pressure variations of the frequency range to which the microphone is intended to be responsive, and such that substantially no such pressure variations are caused to exist within the container on the rear side of the microphone unit. The connector block contains an elongated, restricted passage 26 that constitutes an air or other gas path between the space or chamber 27 of portion 11 and the interior of chamber 28 of a pressure-adjusting member or bellows 29, for example, of thin metal, whose single open end 30 is closed by the connector block to which it is securely fastened by being, for example, sweated thereon. The connector block projects into the bellows to reduce the volume of chamber 28 without losing the advantage of the additional corrugations or pleats of the bellows. The passage 26 is proportioned to be of very high impedance to pressure variations in the frequency range to which the microphone is intended to be responsive, and the container as a whole is so rigid as to be non-resonant over at least the same band of frequencies.

The microphone unit is shown in cross section in Fig. 3. It comprises a permanent magnet 31, that may be of cobalt steel, with a central pole portion 32, and an outer pole portion 33 containing diametrically located slots 34 therein. These slots connect the chamber 27 with the space 64 defined by the magnet. The magnet supports a pole-piece and diaphragm structure assembly 35, shown in enlarged detail in Fig. 4.

The assembly 35 comprises an outer annular plate pole-piece 36 and a circular center pole-piece 37 having a convex or dome-shaped surface 38, which may be of soft iron. It includes a diaphragm structure consisting of two diaphragms 39, 40, the inner diaphragm comprising a centrally stiffened or dome-shaped portion 41, an annular rim or clamping portion 42 and an intermediate, annular tangentially corrugated flexible portion 43.

The diaphragms are, as indicated by the drawings, coaxial, and may be of the same thickness and material, for example, a light-weight, high-strength material such as aluminum or an aluminum alloy, for example, Duralumin. The diaphragms, as shown in Fig. 5, are circular; the outside diameters of the inner and outer diaphragms may be in the ratio of approximately 1.5 to 1; the radial widths of the flexible annuli of the inner and outer diaphragms may be in the ratio of 2 to 1. In a microphone constructed in accordance with the invention, each diaphragm was .001 inch in thickness, diaphragm 40 had an outer diameter of .800 inch and diaphragm 39 an outer diameter of 1.150 inch; the bases of the central stiffened portions were .400 inch and .750 inch, respectively, in diameter. A moving coil 44 of edge-wound aluminum ribbon is secured on its uppermost turn to the diaphragm 39 at the junction of the dome-shaped and flexible portions thereof. The outer diaphragm is relatively more shallow in its central portion and smaller in diameter than the inner diaphragm, but also consists of a centrally stiffened or dome-shaped central portion 45, an annular rim or mounting portion 46 and an intermediate, annular, tangentially corrugated flexible portion 47. The rim portion of the inner diaphragm is clamped against the plate pole by an annular clamping member 48 of non-magnetic material, with the coil 44 disposed in the annular air-gap 70 defined by the opposed vertical annular surfaces of the pole-pieces.

The outer diaphragm is securely fastened at its rim portion to the outer surface of the member 48. The outer surface of the diaphragm 40 may be provided with an anodic finish and be coated with a water-resistant varnish. The central portion of the outer diaphragm is of substantially the same curvature as the central area of the stiffened portion of the inner diaphragm, and is so supported by the member 48 as to rest on and against the inner diaphragm. The contiguous portions of the diaphragm may be fastened together, for example, with a suitable cement. The pole-pieces are maintained in desired spaced relation by an annular plate 49 which is staked at a suitable number of points to both the plate and the center poles. The plate 49 contains a multiplicity of apertures 50, and holds an annulus 51 of acoustic damping material, for example, silk, in position under the air-gap. The coil leads 52 (Fig. 3) are brought out through slots (not shown) in the upper surface of the plate pole and are connected with the cord conductors by the conductive links 53. The assembly 35 is held against the magnet by magnetic attraction, and is properly positioned thereon by cooperating pins (not shown) on the outer pole of the magnet and recesses 54 (only one shown) in the plate pole. The microphone unit is held against turning in the portion 11 by the pin 55. The restricted space or chamber 56 between the diaphragms is connected with the chamber 27 through a small leakage slot 57 in the diaphragm spacer ring or member 48. The slot 57 allows for static variation in pressure but offers a high impedance to pressure variations of the frequency range to which the microphone is intended to be responsive.

The radiation mass $M_R$ of a diaphragm is equal to $8/3\rho a^3$, where $\rho$ is the density of the medium in which the diaphragm is located and $a$ is the effective radius of the diaphragm. In a medium such as air, the radiation mass is small compared to the mass of the diaphragm and its associated moving parts, for example, a moving coil. In a dense medium such as water, however, this is no longer the case. If it is desired to employ in water a microphone that has been constructed or designed for use in air, the increased radiation mass must be reduced in some manner; otherwise, radical changes in the mechanical constants of the moving parts of the microphone and of air damping means associated with the diaphragm become necessary. In accordance with this invention, reduction in the radiation mass is accomplished with no substantial change in the constants of the microphone for use in air, except that of the air damping means (silk) and its associated mass, which must be increased, by addition of the second, outer and small diaphragm, whereby a smaller diaphragm area is exposed to the water medium; this smaller diaphragm is coupled to the larger diaphragm through an air space or chamber of such size that substantially no or only a desired shunting effect occurs with respect to vibration transferred from the outer to the inner diaphragm. The effect of the stiffness added by the outer diaphragm to the moving system of the microphone is to cause a falling off in the response of the microphone at low frequencies compared to the device with a single diaphragm only. Since the radiation mass varies as the cube of the diaphragm radius, and the added stiffness ascribable to the outer diaphragm varies inversely as the square of this radius, the permissible limit to reduction in radiation mass is determined by the character of frequency response desired at the low frequency portion of the audio frequency range.

When the microphone is submerged or immersed in the liquid medium, there will be a pressure acting on the diaphragm structure and coil to force them inwardly against the magnet and pole-pieces. Simultaneously, however, the same head of liquid is acting on the rear side of the diaphragm structure; that is, the liquid fills the portion 12 by entering through the apertures 24 and causes the bellows to adjust in volume in accordance with the liquid pressure at the particular depth. This produces a gas pressure in the bellows, passage 26, chambers 27 and 34, the space 56, the air-gap and the chambers or spaces 58, 59 between the diaphragm 39 and the pole-pieces that equals or balances the liquid pressure acting through the apertures in the wall 16. If the depth of the microphone is changed, the bellows will adjust in accordance with the changed pressure head, and the gas pressure will be altered to balance the different order of liquid pressure acting on the exposed portion of the diaphragm structure. Hence damage to the diaphragm or moving parts of the microphone is avoided, and the stiffened portions of the diaphragm are adapted to move substantially piston-like in response to signal pressure variations in the water. The pressure on the two sides of the small diaphragm will be comparable provided the stiffness of the bellows is less than that of the diaphragm, and the volumes of chambers 27 and 64 of the microphone small compared with the active volume of the bellows. The enclosing of the bellows not only prevents signal pressure variations from acting on the rear side of the diaphragm through the bellows but also prevents the bellows' movements from reacting on the diaphragm through the liquid medium.

When signal pressure variations are produced in the liquid medium and are incident on the diaphragm structure, the two diaphragms respond substantially as a unit thereto, and the resultant movement of the moving coil in the airgap causes currents to be generated in the coil that correspond to such pressure variations. In a specific microphone constructed in accordance with this invention, the device evidenced a response-frequency characteristic of the character shown in Fig. 6.

The microphone described hereinabove may be used as a standard microphone for calibrating microphones of similar or different construction intended for use in a liquid medium, and specifically, under water for detecting marine or submarine signals or disturbances in the audio frequency range. Fig. 1 illustrates a manner in which the microphone might be suspended from a boat in a body of water, the suspension means including an eyelet support 60 and spring 61.

This disclosure has been made with reference to a specific embodiment which at this time is considered to be a preferred one. It will be understood, however, that the invention is not limited thereto, but is of a scope embraced by the appended claims.

What is claimed is:

1. A submarine signal device comprising a pair of diaphragms, one of which is directly exposed to the liquid medium, and in which each diaphragm has a central dome-shaped portion and a peripheral portion, the central portion of said one diaphragm being smaller than that of the other diaphragm and resting on and against a central area of the dome-shaped portion of said other diaphragm, and means to mount the diaphragm peripheral portions in different planes with an air space separating the diaphragm portions adjacent the dome-shaped central portions.

2. A microphone for detecting audio frequency disturbances in a liquid medium, comprising a container to be completely surrounded by the liquid medium having an opening therein for ingress of audio frequency disturbances and a second opening for the ingress of the liquid medium into said container, a diaphragm structure in said container behind said first opening and sealing the container against ingress of liquid through said first opening, said diaphragm structure including a pair of diaphragms of different sizes, the smaller diaphragm only being exposed directly to the liquid medium, and air damping means on one side of the larger diaphragm including means in said container to be acted on by the liquid medium having ingress through said second opening to balance the pressure of said liquid medium acting through said first opening on said pair of diaphragms, said second opening being of high impedance to the audio frequency disturbances.

3. A microphone for detecting audio frequency disturbances in a liquid medium, comprising a front hollow portion having an aperture for ingress of audio frequency disturbances in said medium, a rear hollow portion, a connector block uniting said portions and containing an elongated passage of high impedance to audio frequency waves, a hollow flexible member of volume variable with liquid pressure on its outer surface, said member being secured to said block such that the variable volume defined by said member connects through said elongated passage with the space in the front hollow portion, and diaphragm means mounted in said front portion with an outer surface exposed to the liquid medium through the front portion aperture and with another portion coupled to the space in the front hollow portion, said rear hollow portion containing a passage for ingress of the liquid medium but presenting a high impedance to audio frequency disturbances.

4. A transducer for use in a liquid medium, comprising a support, a diaphragm having a central stiffened outwardly bowed portion, a rim portion and an intermediate flexible portion, a centrally apertured clamping member securing the rim portion of the diaphragm against the support, said clamping member having a radially inwardly projecting portion spaced from the diaphragm flexible portion and surrounding and closely spaced from the bowed portion of the diaphragm, and a second diaphragm supported on the clamping member and closing the aperture therein, said second diaphragm having a central stiffened outwardly bowed portion resting on and against a restricted central area of the stiffened portion of said first diaphragm.

5. In a pressure variation detecting device, a composite diaphragm comprising a pair of circular diaphragms, each of said diaphragms having a central stiffened outwardly bowed portion and an outer mounting portion, the outwardly bowed portion of one diaphragm being of lesser diameter than but of substantially the same curvature as the central portion of the other diaphragm, and a spacer member between the diaphragm outer portions to maintain the latter in different planes with the lesser diameter bowed portion resting on the central area of the bowed portion of said other diaphragm.

6. In a pressure variation detecting device, a composite diaphragm comprising outer and inner diaphragms each of which has a central stiffened dome-shaped portion and an outer mounting portion, the diaphragms being circular and the diameter and height of the central portion of the outer diaphragm and the radial width of the mounting portion of the outer diaphragm being less than those of the corresponding portions of the inner diaphragm, and means to support the mounting portions of the diaphragms in different planes with the central portion of the outer diaphragm axially aligned with and resting on the central portion of the inner diaphragm.

ROBERT BLACK, Jr.
FRANK F. ROMANOW.